US007251935B2

(12) United States Patent

Zhang et al.

(10) Patent No.: US 7,251,935 B2
(45) Date of Patent: Aug. 7, 2007

(54) INDEPENDENT METERING VALVE CONTROL SYSTEM AND METHOD

(75) Inventors: Jiao Zhang, Naperville, IL (US); Pengfei Ma, Naperville, IL (US); Aleksandar Egelja, Naperville, IL (US); Michael T. Verkuilen, Metamora, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 30 days.

(21) Appl. No.: 11/214,905

(22) Filed: Aug. 31, 2005

(65) Prior Publication Data

US 2007/0044465 A1 Mar. 1, 2007

(51) Int. Cl.
*F16D 31/02* (2006.01)
*F15B 13/04* (2006.01)

(52) U.S. Cl. .......................................... 60/461; 91/454

(58) Field of Classification Search .................. 60/459, 60/461; 91/454
See application file for complete search history.

(56) References Cited

U.S. PATENT DOCUMENTS 5,784,945 A 7/1998 Krone et al.
6,694,860 B2 * 2/2004 Yoshino ...................... 91/454
6,718,759 B1 4/2004 Tabor
6,732,512 B2 * 5/2004 Pfaff et al. .................... 60/459
6,880,332 B2 4/2005 Pfaff et al.
2003/0121408 A1 7/2003 Linerode et al.
2005/0051025 A1 3/2005 Nielsen et al.

FOREIGN PATENT DOCUMENTS

GB 2406363 3/2005

* cited by examiner

*Primary Examiner*—Michael Leslie
(74) *Attorney, Agent, or Firm*—Finnegan, Henderson, Farabow, Garrett & Dunner

(57) ABSTRACT

A hydraulic control system has an actuator with first and second chambers, first and second valves having elements movable to fill and drain the first and second chambers, and at least one sensor configured to generate a load signal indicative of a load on the fluid actuator. The system has an interface device movable to generate a desired velocity signal of the actuator. The system has a controller in communication with the first and second valves, the at least one sensor, and the interface device. The controller is configured to move the element of the first valve to a position based on the desired velocity signal and to move the element of the second valve to a position based on the load signal and a desired pressure within the second chamber.

22 Claims, 4 Drawing Sheets

INDEPENDENT METERING VALVE CONTROL SYSTEM AND METHOD

TECHNICAL FIELD

The present disclosure relates generally to a control system and method, and more particularly, to a system and method for controlling an independent metering valve arrangement.

BACKGROUND

Work machines such as, for example, excavators, loaders, dozers, motor graders, and other types of heavy machinery use multiple hydraulic actuators to accomplish a variety of tasks. These actuators are typically velocity controlled based on an actuation position of an operator interface device. For example, an operator interface device such as a joystick, a pedal, or any other suitable operator interface device may be movable to generate a signal indicative of a desired velocity of an associated hydraulic actuator. When an operator moves the interface device, the operator expects the hydraulic actuator to move at an associated predetermined velocity. However, this predetermined velocity is set during manufacture of the work machine, generally without a load being applied to the hydraulic actuator. During operation of the work machine when a load applied against the hydraulic actuator is light, the hydraulic actuator may move at a velocity that substantially matches the operator's expected velocity. However, when the load applied against the hydraulic actuator is heavy, the hydraulic actuator may move at slower and unexpected or undesired velocity. Also, when the load changes direction, the hydraulic actuator may move faster than expected, resulting in voiding within the hydraulic actuator. Attempts to control the velocity of the hydraulic actuator regardless of loading have resulted in harsh or jerky movements of the hydraulic actuator.

One method of improving the predictability of hydraulic actuator velocity while providing smooth operation of they hydraulic actuator is described in U.S. Pat. No. 6,880,332 (the '332 patent) issued to Pfaff et al. on Apr. 19, 2005. The '332 patent describes a hydraulic actuator controlled by electrohydraulic proportional valves to operate in different metering modes. A joystick position signal is converted into a desired velocity signal for the hydraulic actuator. The desired velocity signal is then used to command an opening amount of each of the electrohydraulic proportional valves to drive the hydraulic actuator at the desired velocity. A load on the hydraulic actuator is determined by measuring pressures associated with the hydraulic actuator, and the hydraulic actuator is operated in the different modes based on the determined load. A transition strategy is used to transition between the modes of operation, wherein the supply and return line pressures are set to threshold pressures required for the new mode of operation before transitioning from the old mode of operation.

Although the hydraulic actuator and control strategy of the '332 patent may improve velocity predictability of the fluid actuator under varying loads by basing the mode of operation on measured loading conditions, it may be complicated and still lack sufficient control. In particular, because each of the electrohydraulic proportional valves are controlled based on the desired velocity signal, the control strategy may be complex and require precise timing and calibration to avoid undesired valve interactions. In addition, because the opening amount of the valves is based solely on desired velocity, pressure fluctuations can still adversely affect predictability of the hydraulic actuator.

The disclosed hydraulic control system is directed to overcoming one or more of the problems set forth above.

SUMMARY OF THE INVENTION

In one aspect, the present disclosure is directed to a hydraulic control system. The hydraulic control system includes a fluid actuator having a first chamber, a second chamber, a first metering valve, and a second metering valve. The first metering valve has a valve element movable between a first position at which pressurized fluid is allowed to flow into the first chamber to facilitate movement of the fluid actuator in a first direction, and a second position at which pressurized fluid is blocked from flowing into the first chamber. The second metering valve has a valve element movable between a first position at which fluid is allowed to flow from the second chamber to facilitate movement of the fluid actuator in the first direction, and a second position at which fluid is blocked from flowing from the second chamber. The hydraulic control system also includes at least one fluid sensor associated with the fluid actuator and configured to generate a load signal indicative of a load on the fluid actuator, and an operator interface device movable to generate a desired velocity signal indicative of an operator-desired velocity of the fluid actuator. The hydraulic control system further includes a controller in communication with the first and second metering valves, the at least one fluid sensor, and the operator interface device. The controller is configured to move the valve element of the first metering valve to a position between the first and second positions based on the desired velocity signal, to determine a desired pressure for the second chamber based on the load signal and a pressure associated with the first chamber, and to move the valve element of the second metering valve to a position between the first and second positions based the determined desired pressure.

In another aspect, the present disclosure is directed to a method of operating a hydraulic control system. The method includes metering pressurized fluid into a first chamber of a hydraulic actuator to facilitate movement of the fluid actuator in a first direction, and metering fluid from a second chamber of the hydraulic actuator to facilitate movement of the fluid actuator in the first direction. The method also includes sensing a load on the fluid actuator and generating a load signal indicative of the load. The method further includes receiving a desired velocity signal indicative of an operator-desired velocity of the fluid actuator. The method additionally includes metering fluid into the first chamber based on the desired velocity signal, determining a desired pressure for the second chamber based on the load signal and a pressure associated with the first chamber, and metering fluid from the second chamber based on the determined desired pressure.

DETAILED DESCRIPTION

Figure 1:
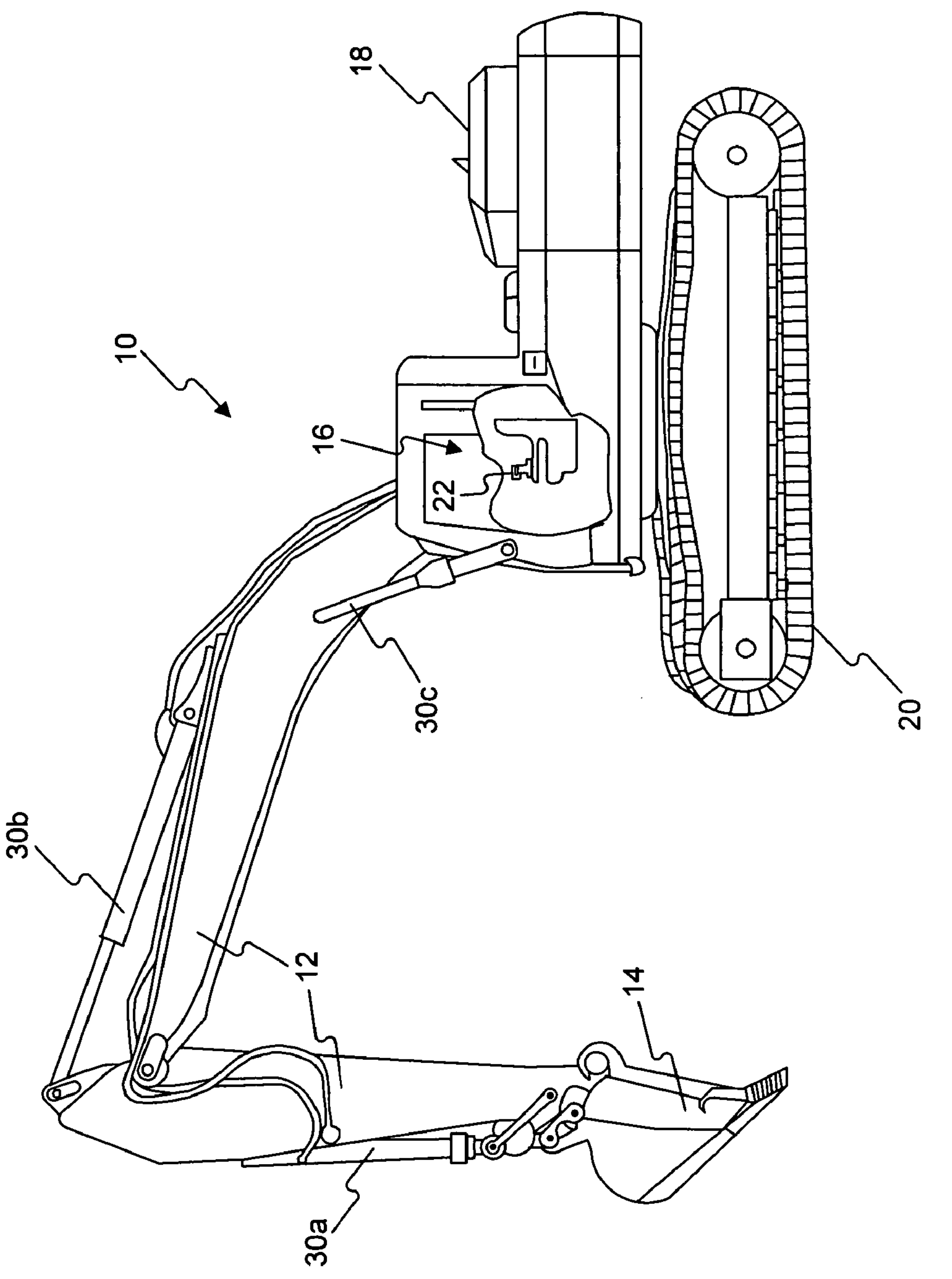
FIG. 1 is a side-view diagrammatic illustration of an exemplary disclosed work machine.

FIG. 1 illustrates an exemplary work machine 10 having multiple components. Work machine 10 may be a fixed or mobile machine that performs some type of operation associated with an industry such as mining, construction, farming, transportation, or any other industry known in the art. For example, work machine 10 may be an earth moving machine such as an excavator, a front shovel, a dozer, a loader, a backhoe, a motor grader, a dump truck, or any other earth moving machine. Work machine 10 may include a frame 12, a work tool 14, one or more hydraulic actuators 30*a-c* connecting work implement 14 to frame 12, an operator station 16, a power source 18, and at least one traction device 20.

Frame 12 may include any structural unit that supports movement of work machine 10. Frame 12 may embody, for example, a stationary base frame connecting power source 18 to traction device 20, a movable frame member of a linkage system, or any other frame known in the art.

Numerous different work tools 14 may be attachable to a single work machine 10 and controllable via operator station 16. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Work tool 14 may be connected to work machine 10 via a direct pivot, via a linkage system, via one or more hydraulic cylinders, via a motor, or in any other appropriate manner. Work tool 14 may be configured to pivot, rotate, slide, swing, lift, or move relative to work machine 10 in any manner known in the art.

Operator station 16 may be configured to receive input from a work machine operator indicative of a desired work tool movement. Specifically, operator station 16 may include one or more operator interface devices 22 embodied as single or multi-axis joysticks located to the sides of an operator seat. Each operator interface device 22 may be a proportional-type controller configured to position and/or orient work tool 14 and to produce an interface device position signal indicative of a desired velocity of work tool 14. It is contemplated that additional and/or different operator interface devices may be included within operator station 16 such as, for example, wheels, knobs, push-pull devices, switches, pedals, and other operator interface devices known in the art.

Power source 18 may embody an engine such as, for example, a diesel engine, a gasoline engine, a gaseous fuel-powered engine, or any other type of engine known in the art. It is contemplated that power source 18 may alternatively embody another source of power such as a fuel cell, a power storage device, an electric or hydraulic motor, or another source of power known in the art.

Traction device 20 may include tracks located on each side of work machine 10 (only one side shown). Alternatively, traction device 20 may include wheels, belts, or other traction devices. Traction device 20 may or may not be steerable. It contemplated that traction device 20 may be hydraulically controlled, mechanically controlled, electronically controlled, or controlled in any other suitable manner.

Figure 2:
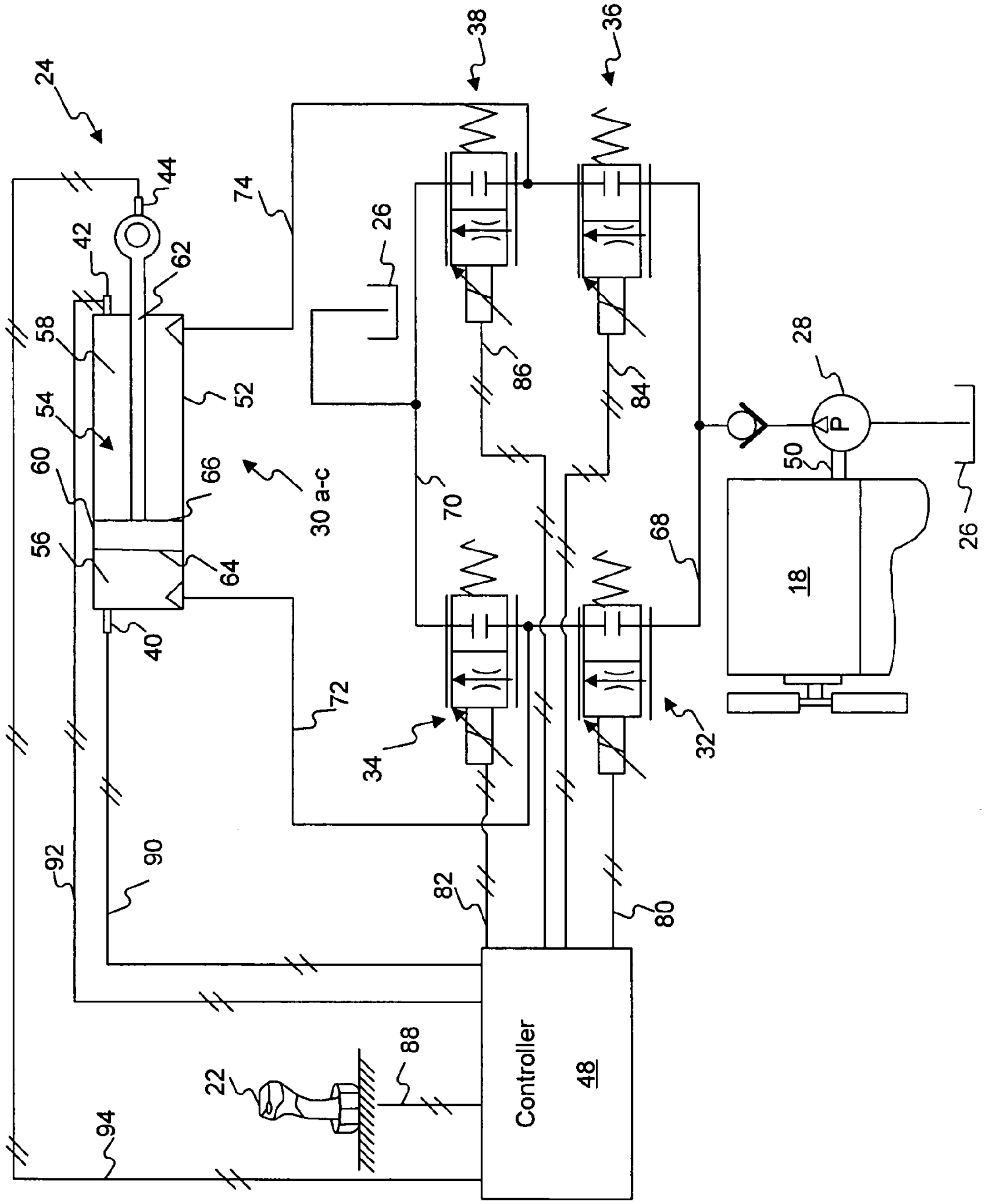
FIG. 2 is a schematic illustration of an exemplary disclosed hydraulic control system for the work machine of FIG. 1.

As illustrated in FIG. 2, work machine 10 may include a hydraulic control system 24 having a plurality of fluid components that cooperate together to move work tool 14. Specifically, hydraulic control system 24 may include a tank 26 holding a supply of fluid, and a source 28 configured to pressurize the fluid and to direct the pressurized fluid to hydraulic actuators 30*a-c*. Hydraulic control system 24 may also include a head-end supply valve 32, a head-end drain valve 34, a rod-end supply valve 36, a rod-end drain valve 38, a head-end pressure sensor 40, a rod-end pressure sensor 42, and an acceleration sensor 44. Hydraulic control system 24 may further include a controller 48 in communication with the fluid components of hydraulic control system 24. It is contemplated that hydraulic control system 24 may include additional and/or different components such as, for example, pressure compensators, accumulators, restrictive orifices, check valves, pressure relief valves, makeup valves, pressure-balancing passageways, temperature sensors, position sensors, and other such components known in the art. It is contemplated that acceleration sensor 44 may be omitted, if desired.

Tank 26 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 26. It is also contemplated that hydraulic control system 24 may be connected to multiple separate fluid tanks.

Source 28 may be configured to produce a flow of pressurized fluid and may include a pump such as, for example, a variable displacement pump, a fixed displacement pump, or any other source of pressurized fluid known in the art. Source 28 may be drivably connected to power source 18 of work machine 10 by, for example, a countershaft 50, a belt (not shown), an electrical circuit (not shown), or in any other suitable manner. Alternatively, source 28 may be indirectly connected to power source 18 via a torque converter, a gear box, or in any other manner known in the art. It is contemplated that multiple sources of pressurized fluid may be interconnected to supply pressurized fluid to hydraulic control system 24.

It should be noted that, while FIG. 1 depicts three hydraulic actuators, identified as 30*a*, 30*b*, and 30*c*, for the purposes of simplicity, the hydraulic schematic of FIG. 2 depicts only hydraulic actuator 30*c*. Thus, while all description of hydraulic control system 24 will be with reference to only hydraulic actuator 30*c*, the description may be just as applicable to hydraulic actuators 30*a* and 30*b*. In addition, the description of hydraulic actuator 30*c* may be just as applicable to a swing actuator (not shown) that functions to swing frame 12 relative to traction devices 20, or any other suitable hydraulic actuator.

Hydraulic actuator 30*c* may include a fluid cylinder that connects work tool 14 to frame 12 (referring to FIG. 1) via a direct pivot, via a linkage system with hydraulic actuator 30*c* forming a member in the linkage system, or in any other appropriate manner. It is contemplated that a hydraulic actuator other than a fluid cylinder may alternatively be implemented within hydraulic control system 24 such as, for example, a hydraulic motor or any other type of actuator known in the art. As illustrated in FIG. 2, hydraulic actuator 30*c* may include a tube 52 and a piston assembly 54 disposed within tube 52. One of tube 52 and piston assembly 54 may be pivotally connected to frame 12, while the other of tube 52 and piston assembly 54 may be pivotally connected to work tool 14. It is contemplated that tube 52 and/or piston assembly 54 may alternatively be fixedly connected to either frame 12 or work tool 14. Hydraulic actuator 30*c* may include a first chamber 56 and a second chamber 58 separated by a piston 60. First and second chambers 56, 58 may be selectively supplied with pressurized fluid from source 28 and selectively connected with tank 26 to cause piston assembly 54 to displace within tube 52, thereby changing the effective length of hydraulic actuator 30*c*. The expansion and retraction of hydraulic actuator 30*c* may function to assist in moving work tool 14.

Piston assembly 54 may include a piston 60 being axially aligned with and disposed within tube 52, and a piston rod 62 connectable to one of frame 12 and work tool 14 (referring to FIG. 1). Piston 60 may include a first hydraulic surface 64 and a second hydraulic surface 66 opposite first hydraulic surface 64. An imbalance of force caused by fluid pressure on first and second hydraulic surfaces 64, 66 may result in movement of piston assembly 54 within tube 52. For example, a force on first hydraulic surface 64 being greater than a force on second hydraulic surface 66 may cause piston assembly 54 to displace to increase the effective length of hydraulic actuator 30*c*. Similarly, when a force on second hydraulic surface 66 is greater than a force on first hydraulic surface 64, piston assembly 54 may retract within tube 52 to decrease the effective length of hydraulic actuator 30*c*. A flow rate of fluid into and out of first and second chambers 56 and 58 may determine a velocity of hydraulic actuator 30*c*, while a pressure of the fluid in contact with first and second hydraulic surfaces 64 and 66 may determine an actuation force of hydraulic actuator 30*c*. A sealing member (not shown), such as an o-ring, may be connected to piston 60 to restrict a flow of fluid between an internal wall of tube 52 and an outer cylindrical surface of piston 60.

Head-end supply valve 32 may be disposed between source 28 and first chamber 56 and configured to regulate a flow of pressurized fluid to first chamber 56 in response to a command extension velocity from controller 48. Specifically, head-end supply valve 32 may include a proportional spring-biased valve mechanism that is solenoid-actuated and configured to move between a first position at which fluid is allowed to flow into first chamber 56 and a second position at which fluid flow is blocked from first chamber 56. Head-end supply valve 32 may be movable to any position between the first and second positions to vary the rate of flow into first chamber 56, thereby affecting the extension velocity of hydraulic actuator 30*c*. It is contemplated that head-end supply valve 32 may alternatively be hydraulically-actuated, mechanically-actuated, pneumatically-actuated, or actuated in any other suitable manner. It is further contemplated that head-end supply valve 32 may be configured to allow fluid from first chamber 56 to flow through head-end supply valve 32 during a regeneration event when a pressure within first chamber 56 exceeds a pressure within head-end supply valve 32. For the purposes of this disclosure, regeneration may include directing pressurized fluid from the draining one of first and second chambers 56, 58 to the filling one of first and second chambers 56, 58 as a portion of the total flow into the filling chamber.

Head-end drain valve 34 may be disposed between first chamber 56 and tank 26 and configured to regulate a flow of fluid from first chamber 56 to tank 26 in response to a command pressure from controller 48 during a retraction operation. Specifically, head-end drain valve 34 may include a proportional spring-biased valve mechanism that is solenoid-actuated and configured to move between a first position at which fluid is allowed to flow from first chamber 56 and a second position at which fluid is blocked from flowing from first chamber 56. Head-end drain valve 34 may be movable to any position between the first and second positions to vary the pressure of the fluid within first chamber 56. It is contemplated that head-end drain valve 34 may alternatively be hydraulically-actuated, mechanically-actuated, pneumatically-actuated, or actuated in any other suitable manner.

Rod-end supply valve 36 may be disposed between source 28 and second chamber 58 and configured to regulate a flow of pressurized fluid to second chamber 58 in response to the command retraction velocity from controller 48. Specifically, rod-end supply valve 36 may include a proportional spring-biased valve mechanism that is solenoid-actuated and configured to move between a first position at which fluid is allowed to flow into second chamber 58 and a second position at which fluid is blocked from second chamber 58. Rod-end supply valve 36 may be movable to any position between the first and second positions to vary the rate of flow into second chamber 58, thereby affecting the retraction velocity of hydraulic actuator 30*c*. It is contemplated that rod-end supply valve 36 may alternatively be hydraulically-actuated, mechanically-actuated, pneumatically-actuated, or actuated in any other suitable manner. It is further contemplated that rod-end supply valve 36 may be configured to allow fluid from second chamber 58 to flow through rod-end supply valve 36 during a regeneration event when a pressure within second chamber 58 exceeds a pressure within rod-end supply valve 36.

Rod-end drain valve 38 may be disposed between second chamber 58 and tank 26 and configured to regulate a flow of fluid from second chamber 58 to tank 26 in response to a command pressure from controller 48 during an extension operation. Specifically, rod-end drain valve 38 may include a proportional spring-biased valve mechanism that is solenoid-actuated and configured to move between a first position at which fluid is allowed to flow from second chamber 58 and a second position at which fluid is blocked from flowing from second chamber 58. Rod-end drain valve 38 may be movable to any position between the first and second positions to vary the pressure of the fluid within second chamber 58. It is contemplated that rod-end drain valve 38 may alternatively be hydraulically-actuated, mechanically-actuated, pneumatically-actuated, or actuated in any other suitable manner.

Head and rod-end supply and drain valves 32-38 may be fluidly interconnected. In particular, head and rod-end supply valves 32, 36 may be connected in parallel to a common supply passageway 68 extending from source 28. Head and rod-end drain valves 34, 38 may be connected in parallel to a common drain passageway 70 leading to tank 26. Head-end supply and drain valves 32, 34 may be connected in parallel to a first chamber passageway 72 for selectively supplying and draining first chamber 56 in response to the command velocity and pressure from controller 48. Rod-end supply and drain valves 36, 38 may be connected in parallel to a common second chamber passageway 74 for selectively supplying and draining second chamber 58 in response to the command velocity and pressure from controller 48.

Head and rod-end pressure sensors 40, 42 may be in fluid communication with first and second chambers 56, 58, respectively and configured to sense the pressure of the fluid within first and second chambers 56, 58. Head and rod-end pressure sensors 40, 42 may be further configured to generate load signals indicative of the pressures within first and second chambers 56, 58. The pressure measurements generated by head and rod-end pressure sensors 40, 42 may be compared with a time measurement to generate a dynamic pressure measurement that is indicative of the acceleration of hydraulic cylinder 30*c*.

Acceleration sensor 44 may be associated with hydraulic cylinder 30*c* and configured to sense the acceleration of cylinder movement and generate a corresponding acceleration signal. It is contemplated that acceleration sensor 44 may be omitted, if desired, and the acceleration of hydraulic cylinder 30*c* determined from the dynamic pressure measurement described above. It is further contemplated that when acceleration sensor 44 is implemented, the dynamic pressure measurement may be utilized to calibrate acceleration sensor 44.

Controller 48 may embody a single microprocessor or multiple microprocessors that include a means for controlling an operation of hydraulic control system 24. Numerous commercially available microprocessors can be configured to perform the functions of controller 48. It should be appreciated that controller 48 could readily be embodied in a general work machine microprocessor capable of controlling numerous work machine functions. Controller 48 may include a memory, a secondary storage device, a processor, and any other components for running an application. Various other circuits may be associated with controller 48 such as power supply circuitry, signal conditioning circuitry, solenoid driver circuitry, and other types of circuitry.

One or more maps relating interface device position, fluid actuator load, command velocity, and command pressure for hydraulic actuator 30*c* may be stored in the memory of controller 48. Each of these maps may be in the form of tables, graphs, and/or equations. In one example, interface device position, command velocity, and fluid actuator load may form the coordinate axis of a 3-D table for control of head and rod-end supply valves 32, 36. Command velocity and valve element position of the appropriate supply valve may be related in a separate 2-D map or in another 3-D map, with a measured inlet pressure (i.e., from one of head and rod-end pressure sensors 40, 42) as the third input. It is also contemplated that the interface device position signal may be directly related to valve element position in a single 3-D map. In the same example, the three axis of another 3-D map within the memory of controller 48 may relate load information, commanded velocity of the supply valves, and command pressure for control of head and rod-end drain valves 34, 38. Controller 48 may be configured to allow the operator to directly modify these maps and/or to select specific maps from available relationship maps stored in the memory of controller 48 to affect actuation of hydraulic actuator 30*c*. It is contemplated that the maps may be selectable based on the operation of work machine 10 such as, for example, extension or retraction with resistive or overrunning loads, during transitioning from resistive to overrunning loads, and during other such operations of work machine 10.

The resistive operations of work machine 10 may include operations in which hydraulic actuator 30*c* opposes an externally-generated force. The overrunning operations may include operations in which a load on work machine 10 naturally assists movement of hydraulic actuator 30*c* in a desired direction. The transition operations may include the operation of hydraulic actuator 30*c* during the shift between resistive and overrunning operations. During typical resistive and overrunning operation, only two of head and rod-end supply and drain valves 32-38 may be passing fluid, while the remaining two may be in the flow blocking positions. For example, when hydraulic actuator 30*c* is extending to move the boom portion of frame 12 (referring to FIG. 1) upward against the pull of gravity (resistive operation), head-end supply valve 32 (referring to FIG. 2) may be moved toward the first or flow-passing position to fill first chamber 56 with pressurized fluid. Simultaneously, rod-end drain valve 38 may be moved toward the flow-passing position to allow the fluid from second chamber 58 to drain to tank 26. In this situation, both of head-end drain valve 34 and rod-end supply valve 36 may be in the second or flow-blocking positions to prevent undesired movement of hydraulic actuator 30*c*. However, during a regeneration or dynamic pressure-sensing operation, head-end drain and rod-end supply valves 34, 36 may also be selectively moved toward the first position. When hydraulic actuator 30*c* is retracting to move the boom portion of frame 12 (referring to FIG. 1) downward with the pull of gravity (overrunning operation), head-end drain valve 34 (referring to FIG. 2) may be moved to the first or flow-passing position to drain first chamber 56 of pressurized fluid. Simultaneously, rod-end supply valve 36 may be moved toward the flow-passing position to fill second chamber 58 with pressurized fluid. In this situation, both of head end supply valve 32 and rod-end drain valve 38 may be in the second or flow-blocking positions to prevent undesired movement of hydraulic actuator 30*c*. Again, however, during a regeneration or dynamic pressure-sensing operation, head-end supply and rod-end drain valves 32, 38 may also be selectively moved toward the first position.

Controller 48 may be configured to receive input from operator interface device 22 and head and rod-end pressure sensors 40, 42, and to command operation of head and rod-end supply and drain valves 32-38 in response to the input and the relationship maps described above. Specifically, controller 48 may be in communication with head and rod-end supply and drain valves 32-38 of hydraulic actuator 30*c* via communication lines 80, 82, 84, and 86 respectively; with operator interface device 22 via a communication line 88; and with head and rod-end pressure sensors 40, 42 via communication lines 90 and 92 respectively. Controller 48 may receive the interface device position signal from operator interface device 22 and the hydraulic actuator load signals from head and rod-end pressure sensors 40, 42, and reference the selected and/or modified relationship maps stored in the memory of controller 48 to determine command velocity and desired pressure values. The command velocities may cause head-end and rod-end supply valves 32 and 36 to selectively fill the appropriate chamber at a flow rate that results in the desired work tool velocity. The commanded pressures may cause head-end and rod-end drain valves 34 and 38 to selectively drain first and second chambers 56, 58 at a flow rate that results in the desired pressure within the corresponding draining chamber.

Controller 48 may be configured to affect valve element movement of head and rod-end supply and drain valves 32-38 in response to an acceleration of hydraulic cylinder 30*c*. In particular, controller 48 may be in communication with acceleration sensor 44 via a communication line 94 and configured to receive the acceleration signal from acceleration sensor 44. Controller 48 may be configured to modify the command velocity and/or desired pressure in response to the acceleration signal. The relationship between command velocity and/or pressure, and the acceleration signal may be contained within one or more tables, graphs, or equations stored within the memory of controller 48.

Controller 48 may also be configured to selectively implement regeneration. Specifically, controller 48 may receive the load signals from pressure sensors 40 and 42, and determine whether or not regeneration is possible. For example, if hydraulic actuator 30*c* is retracting and the pressure of the fluid exiting second chamber 58 exceeds the pressure of the fluid within first chamber 56, controller 48 may determine that at least a portion of the fluid from second chamber 58 may be redirected to first chamber 56. In this situation, the required output of source 28 may be lower than if regeneration was not available and, thus, source 28 may be operated at a reduced power consumption level.

Controller 48 may regulate the amount of regeneration and the output of source 28 based on operator input. In particular, the ratio of regenerative fluid to fluid from source 28 flowing into the filling chamber may be based on an actuation position of operator input device 22. The relationship between operator interface device position and the percent of allowable regenerative flow may be contained within a table, graph, or equation stored within the memory of controller 48. Source 28 may then be operated to produce the flow rate of pressurized fluid required to move hydraulic actuator 30*c* at the desired velocity minus the amount of fluid that is regenerated from second chamber 58. If regeneration is not possible, source 28 may be operated to produce the full flow rate of pressurized fluid required to move hydraulic cylinder 30*c* at the desired velocity.

Figure 3:
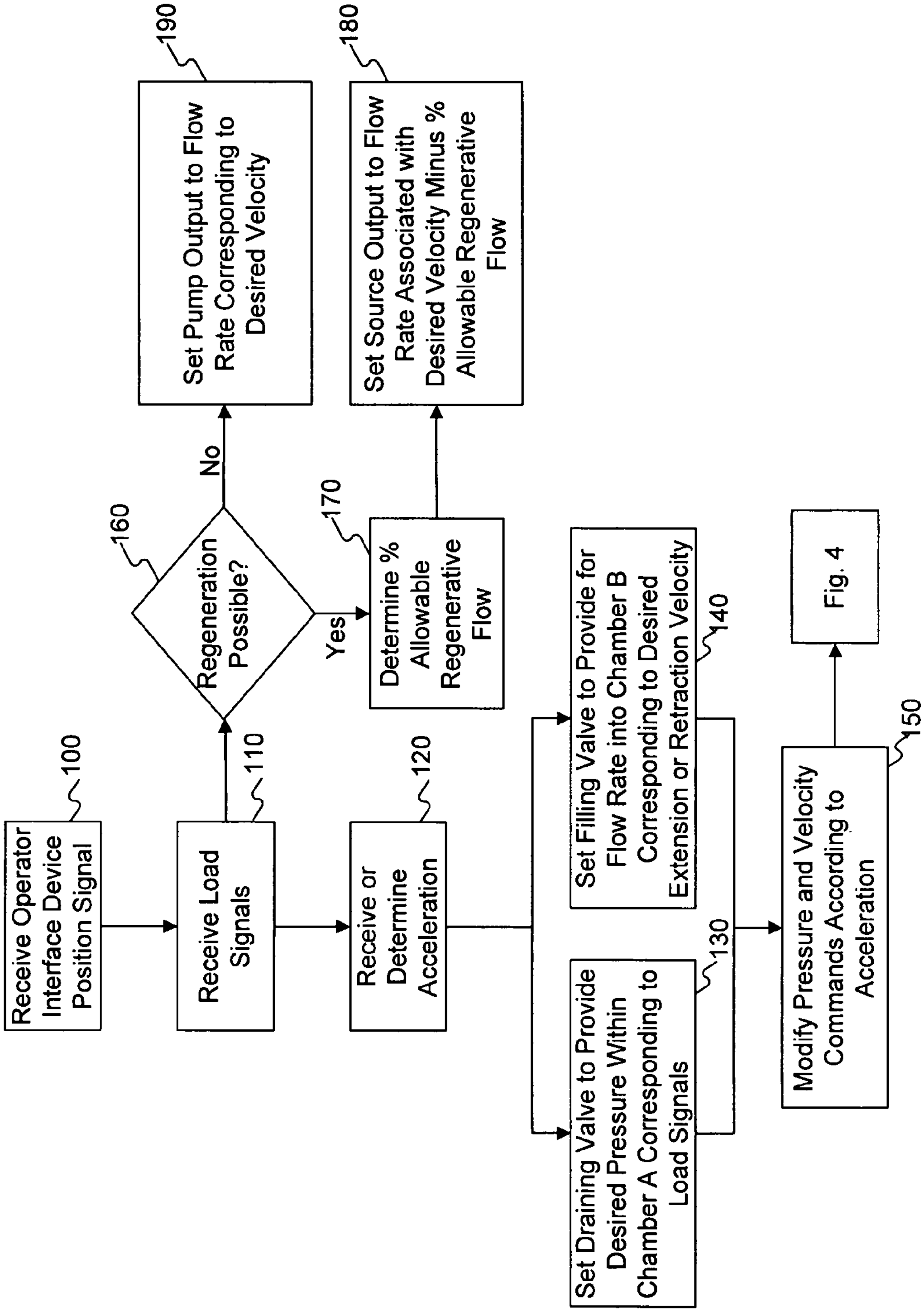
FIG. 3 is a flow chart illustrating an exemplary disclosed method of operating the control system of FIG. 2.
Figure 4:
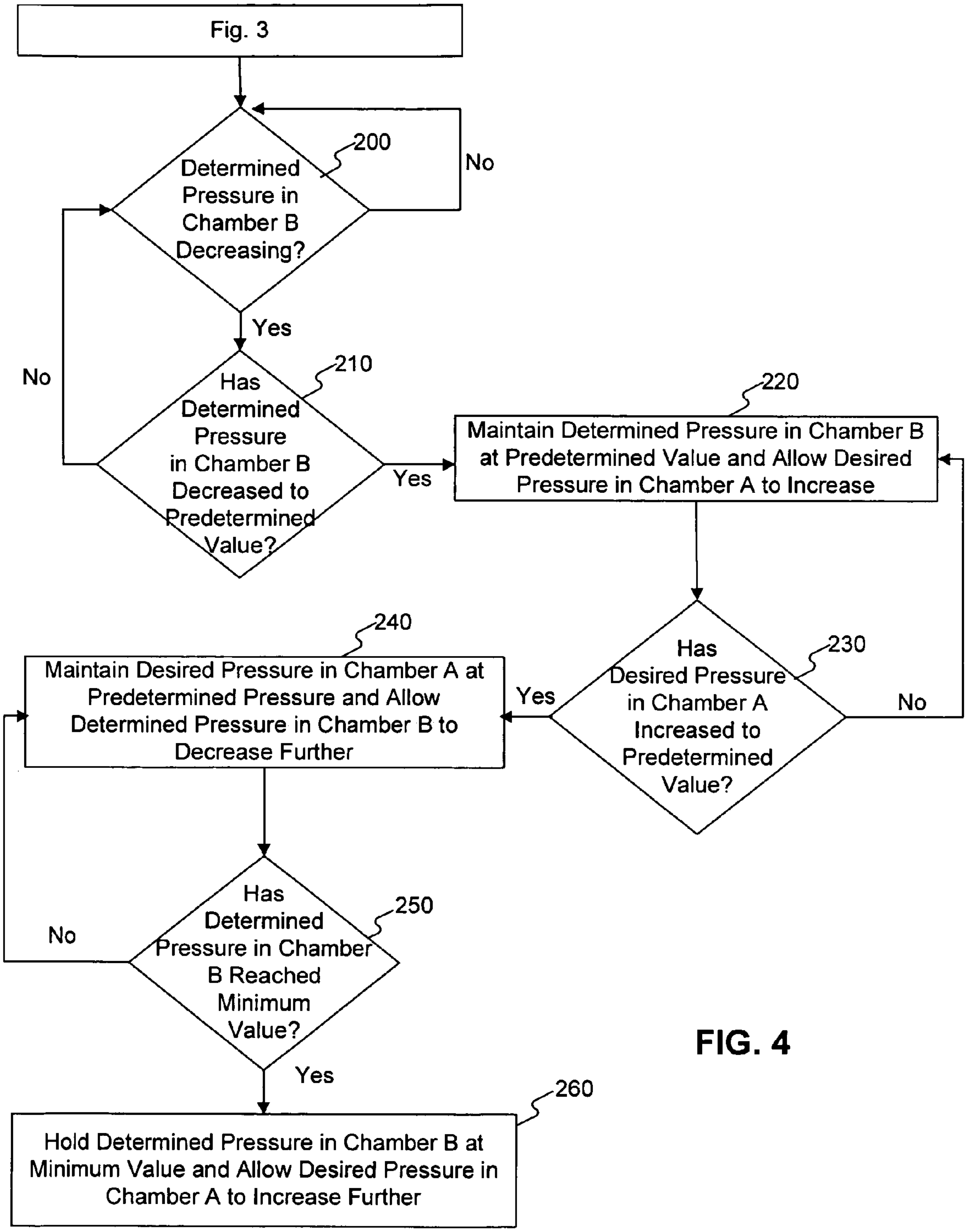
FIG. 4 is a flow chart illustrating another exemplary disclosed method of operating the control system of FIG. 2.

FIGS. 3 and 4 illustrate exemplary methods of operating hydraulic control system 24. FIGS. 3 and 4 will be discussed in the following section to further illustrate the disclosed system and its operation

INDUSTRIAL APPLICABILITY

The disclosed hydraulic control system may be applicable to any work machine that includes a hydraulic actuator where velocity predictability under varying loads and operation is desired. The disclosed hydraulic control system may improve operator control by relating hydraulic actuator loading and acceleration to a velocity and/or pressure commanded of valves associated with the hydraulic actuator. The operation of hydraulic control system 24 will now be explained.

During operation of work machine 10, a work machine operator may manipulate operator interface device 22 to create a movement of work tool 14. The actuation position of operator interface device 22 may be related to an operator expected or desired velocity of work tool 14. Operator interface device 22 may generate a position signal indicative of the operator expected or desired velocity during operator manipulation and send this position signal to controller 48.

Controller 48 may receive various input during operation of hydraulic cylinder 30*c*. As indicated in the flow chart of FIG. 3, controller 48 may receive the operator interface device position signal (Step 100), receive the load signal from head and rod-end pressure sensors 40, 42 (Step 110), and receive signals indicative of a measured and/or determined acceleration of hydraulic cylinder 30*c* (Step 120). From the load signals, controller 48 may determine a magnitude of load on hydraulic cylinder 30*c*. The magnitude of the load may be calculated from standard equations that relate the measured pressures to the force areas of first and second hydraulic surfaces 64 and 66.

In addition, the operation of work machine 10 (e.g., resistive, overrunning, or transition) may be determined by the direction of cylinder travel and the load. For example, if the cylinder travel direction and load direction is the same, work machine 10 may be performing an overrunning operation. Conversely, if the cylinder travel direction and load direction are different, work machine 10 may be performing a resistive operation. If the cylinder travel direction is changing, work machine 10 may be transitioning between overrunning and resistive operations.

When performing resistive or over-running operations, controller 48 may set the valve element position of the draining valve to provide for a desired pressure within the draining one of first and second chambers 56, 58. The desired pressure and associated valve mechanism position may be based on the measured loading condition of hydraulic cylinder 30*c*, a pressure within the filling one of first and second chambers 56 required to move the loaded cylinder, and a desired velocity, and may be established through the lookup tables, graphs, and/or equations stored within the memory of controller 48 (Step 130). The valve element position between the flow-passing and flow-blocking positions may be continuously controlled according to the load signals received from head and rod-end pressure sensors 40, 42 to generate the desired pressure within the draining chamber.

Also during resistive or overrunning operation of hydraulic cylinder 30*c*, controller 48 may compare the desired velocity signal from operator interface device 22 and load signal to the relationship map stored in the memory of controller 48 to determine an appropriate velocity command for the operational one of head and rod-end supply valves 32, 36. Controller 48 may then command valve element movement of the appropriate one of head and rod-end supply valves 32 and 36 to regulate the flow rate of pressurized fluid into the appropriate one of first and second chambers 56, 58, thereby causing movement of hydraulic actuator 30*c* that substantially matches the operator expected or desired velocity (Step 140).

Controller 48 may account for acceleration of hydraulic actuator 30*c*. Specifically, controller 48 may modify the commanded valve element positions of the appropriate filling and draining valves according to the sensed acceleration information from acceleration sensor 44 or according to acceleration determined from the dynamic pressure measurements (Step 150). As indicated above, the amount of modification may be determined by referencing a look-up table or graph, or by calculation via one or more equations such that, when steady state is achieved, the velocity of hydraulic actuator 30*c* will substantially match the desired velocity, and the pressure within the draining chamber will be set to the desired value.

Controller 48 may regulate regeneration during low-resistive and overrunning operations according to operator input. In particular, controller 48 may first determine whether regeneration is possible (Step 160) by concluding that hydraulic actuator 30*c* is currently performing a low-resistive or overrunning operation and that the desired pressure in the draining one of first and second chambers 56, 58 exceeds the measured pressure in the filling one of first and second chambers 56, 58. If regeneration is possible, controller 48 may determine the percent of the total flow into the filling chamber that may be regenerated from the draining chamber (Step 170). This determination may be based on the position of operator interface device 22 and a relationship stored in the memory of controller 48.

The output flow of source 28 may be controlled differently depending on the allowed percent of regenerative flow. In particular, if regeneration is possible, source 28 may be commanded to output a flow of pressurized fluid at a rate substantially equaling the required flow rate of fluid into the filling chamber minus the percent allowable regenerative flow (180). For example, if a flow rate of 30 units/min into first chamber 56 is required to extend hydraulic actuator 30*c* at the desired velocity and the percent allowable regenerative flow is 10%, source 28 must be operated to produce a flow rate of 27 units/min. However, if regeneration not possible (e.g., if hydraulic actuator 30*c* is performing a resistive operation), source 28 must be operated to produce all 30 units/min corresponding to the desired velocity (Step 190).

During transition between resistive and overrunning operations, controller 48 may closely regulate the pressures within both first and second chambers 56 and 58 to minimize the likelihood of cavitation and pressure and velocity fluctuations. In particular, controller 48 may first determine whether or not hydraulic actuator 30*c* is transitioning between overrunning and resistive operations. Controller 48 may conclude that hydraulic actuator 30*c* is transitioning when the determined pressure (pressure determined necessary to move the load placed on hydraulic actuator 30*c*) within the filling one (referenced as chamber B in the flow chart of FIG. 4) of first and second chambers 56, 58 is decreasing (Step 200). If controller 48 establishes that the determined pressure of the fluid within chamber B has decreased to a predetermined threshold value (Step 210), controller 48 may maintain the determined pressure within chamber B at the threshold value and allow the desired pressure within the draining chamber (referenced as chamber A in the flow chart of FIG. 4) to increase (Step 220).

Controller 48 may determine whether or not the desired pressure within chamber A has increased to a second predetermined threshold value (Step 230) and affect the desired pressure of the fluid within chamber A accordingly. Specifically, if the desired pressure within chamber A has increased to the second predetermined threshold value, controller 48 may maintain the desired pressure within chamber A and allow the determined pressure within chamber B to decrease further (Step 240). Controller 48 may then monitor the determined pressure within chamber B and decide whether or not the determined pressure has reached a minimum threshold value (Step 250). If the determined pressure within chamber B has reached the minimum threshold value, controller 48 may then maintain the determined pressure within chamber B at the minimum threshold value and allow the desired pressure within chamber A to increase beyond the second threshold value (Step 260).

Because head and rod-end supply valves 32 and 36 are controlled based on a desired velocity, and head and rod-end drain valves 34 and 38 are controlled based on a desired pressure derived from the load information from head and rod-end pressure sensors 40, 42, the control of hydraulic actuators 30*a-c* may be simplified. In addition, because head and rod-end drain valves 34 and 38 are controlled based on a desired pressure determined from a measured load, hydraulic actuators 30*a-c* may perform predictably under varying loads and provide for a seamless transition between resistive and overrunning operations.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:

a fluid actuator having a first chamber and a second chamber;

a first metering valve having a valve element movable between a first position at which pressurized fluid is allowed to flow into the first chamber to facilitate movement of the fluid actuator in a first direction, and a second position at which pressurized fluid is blocked from flowing into the first chamber;

a second metering valve having a valve element movable between a first position at which fluid is allowed to flow from the second chamber to facilitate movement of the fluid actuator in the first direction, and a second position at which fluid is blocked from flowing from the second chamber;

at least one fluid sensor associated with the fluid actuator and configured to generate a load signal indicative of a load on the fluid actuator;

an operator interface device movable to generate a desired velocity signal indicative of an operator-desired velocity of the fluid actuator; and a controller in communication with the first and second metering valves, the at least one fluid sensor, and the operator interface device, the controller configured to move the valve element of the first metering valve to a position between the first and second positions based on the desired velocity signal and to move the valve element of the second metering valve to a position between the first and second positions based on the load signal and a desired pressure in the second chamber.

2. The hydraulic control system of claim 1, wherein the controller is further configured to modify the valve element positions of the first and second metering valves based on an acceleration of the hydraulic actuator.

3. The hydraulic control system of claim 2, further including an acceleration sensor associated with the fluid actuator and configured to sense the acceleration of the hydraulic actuator.

4. The hydraulic control system of claim 2, wherein the at least one fluid sensor is a pressure sensor and the acceleration is determined based on a dynamic pressure measured by the pressure sensor.

5. The hydraulic control system of claim 1, wherein the controller is further configured to determine if regeneration of hydraulic energy is possible based on the load signal.

6. The hydraulic control system of claim 5, wherein the controller is further configured to implement regeneration an amount based on a position of the operator interface device.

7. The hydraulic control system of claim 6, further including a source of pressurized fluid, wherein the controller is configured to regulate the output of the source based on the amount of regeneration and the desired velocity signal.

8. The hydraulic control system of claim 1, wherein:

the at least one fluid sensor is a first pressure sensor associated with the first chamber;

the hydraulic control system further includes a second pressure sensor associated with the second chamber; and the controller is further configured to implement a transition strategy when the pressure in the first chamber decreases below a predetermined value.

9. The hydraulic control system of claim 8, wherein the transition strategy includes:

allowing the pressure in the second chamber to increase based on the load signal after the pressure in the first chamber has reached the predetermined value;

maintaining the pressure in the first chamber at the predetermined value until the pressure in the second chamber has reached a second predetermined value;

allowing the pressure in the first chamber to decrease below the predetermined value after the pressure in the second chamber has reached the second predetermined value;

maintaining the pressure in the second chamber at the second predetermined value until the pressure in the first chamber has reached a minimum predetermined value; and allowing the pressure in the second chamber to exceed the second predetermined value based on the load signal after the pressure in the first chamber has reached the minimum predetermined value.

10. A method of operating a hydraulic control system, comprising:

metering pressurized fluid into a first chamber of a hydraulic actuator to facilitate movement of the fluid actuator in a first direction;

metering fluid from a second chamber of the hydraulic actuator to facilitate movement of the fluid actuator in the first direction;

sensing a load on the fluid actuator and generating a load signal indicative of the load;

receiving a desired velocity signal indicative of an operator-desired velocity of the fluid actuator;

metering fluid into the first chamber based on the desired velocity signal; and metering fluid from the second chamber based on the load signal and a desired pressure in the second chamber.

11. The method of claim 10, further including modifying the metering of fluid into the first chamber and from the second chamber based on an acceleration of the hydraulic actuator.

12. The method of claim 11, further including sensing an acceleration of the fluid actuator.

13. The method of claim 11, wherein sensing a load includes sensing dynamic pressures within the first and second chambers, and the method further includes determining acceleration of the fluid actuator based on the sensed dynamic pressures.

14. The method of claim 10, further including determining if regeneration of hydraulic energy is possible based on the load signal.

15. The method of claim 14, further including implementing regeneration an amount based on the desired velocity signal.

16. The method of claim 15, further including regulating the output of a source of pressurized fluid based on the amount of regeneration and the desired velocity signal.

17. The method of claim 10, wherein sensing a load includes sensing a pressure within the first chamber and a pressure in the second chamber, and the method further includes implementing a transition strategy when the pressure in the first chamber decreases below a predetermined value.

18. The method of claim 17, wherein the transition strategy includes:

allowing the pressure in the second chamber to increase based on the load signal after the pressure in the first chamber has reached the predetermined value;

maintaining the pressure in the first chamber at the predetermined value until the pressure in the second chamber has reached a second predetermined value;

allowing the pressure in the first chamber to decrease below the predetermined value after the pressure in the second chamber has reached the second predetermined value;

maintaining the pressure in the second chamber at the second predetermined value until the pressure in the first chamber has reached a minimum predetermined value; and allowing the pressure in the second chamber to exceed the second predetermined value based on the load signal after the pressure in the first chamber has reached the minimum predetermined value.

19. A machine, comprising:

a power source;

a tool;

a source of pressurized fluid operably driven by the power source;

a fluid actuator configured to affect movement of the tool and having a first chamber and a second chamber;

a first metering valve having a valve element movable between a first position at which pressurized fluid is allowed to flow into the first chamber to facilitate movement of the fluid actuator in a first direction, and a second position at which pressurized fluid is blocked from flowing into the first chamber;

a second metering valve having a valve element movable between a first position at which fluid is allowed to flow from the second chamber to facilitate movement of the fluid actuator in the first direction, and a second position at which fluid is blocked from flowing from the second chamber;

a first pressure sensor associated with the first chamber and configured to generate a first pressure signal;

a second pressure sensor associated with the second chamber and configured to generate a second pressure signal;

an operator interface device movable to generate a desired velocity signal indicative of an operator-desired velocity of the fluid actuator; and a controller in communication with the first and second metering valves, the first and second pressure sensors, and the operator interface device, the controller configured to move the valve element of the first metering valve to a position between the first and second positions based on the desired velocity signal, to determine a load on the work tool based on the first and second pressure signals, and to move the valve element of the second metering valve to a position between the first and second positions based on the determined load and a desired pressure in the second chamber.

20. The machine of claim 19, further including an acceleration sensor associated with the hydraulic actuator, wherein the controller is further configured to modify the valve element positions of the first and second metering valves based on a sensed acceleration of the hydraulic actuator.

21. The machine of claim 19, wherein the controller is further configured:

to determine if regeneration of hydraulic energy is possible based on the load signal;

implement regeneration an amount based on a position of the operator interface device; and regulate the output of the source based on the amount of regeneration and the desired velocity signal.

22. The machine of claim 19, wherein the controller is further configured to implement a transition strategy when the pressure in the first chamber decreases below a predetermined value and the transition strategy includes:

allowing the pressure in the second chamber to increase based on the load signal after the pressure in the first chamber has reached the predetermined value;

maintaining the pressure in the first chamber at the predetermined value until the pressure in the second chamber has reached a second predetermined value;

allowing the pressure in the first chamber to decrease below the predetermined value after the pressure in the second chamber has reached the second predetermined value;

maintaining the pressure in the second chamber at the second predetermined value until the pressure in the first chamber has reached a minimum predetermined value; and allowing the pressure in the second chamber to exceed the second predetermined value based on the load signal after the pressure in the first chamber has reached the minimum predetermined value.

* * * * *

UNITED STATES PATENT AND TRADEMARK OFFICE

CERTIFICATE OF CORRECTION

PATENT NO. : 7,251,935 B2
APPLICATION NO. : 11/214905
DATED : August 7, 2007
INVENTOR(S) : Zhang et al.

It is certified that error appears in the above-identified patent and that said Letters Patent is hereby corrected as shown below:

On the Title Page, in Field (57), under “ABSTRACT”, in Column 2, Line 5, delete “fluid”.

Signed and Sealed this

First Day of July, 2008

JON W. DUDAS
*Director of the United States Patent and Trademark Office*